(12) United States Patent
Aposhian et al.

(10) Patent No.: US 10,980,171 B2
(45) Date of Patent: Apr. 20, 2021

(54) FACILITATING TURNING OF A MOWER

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 256 days.

(21) Appl. No.: 16/135,970

(22) Filed: Sep. 19, 2018

(65) Prior Publication Data

US 2020/0084960 A1 Mar. 19, 2020

(51) Int. Cl.
*A01D 34/00* (2006.01)
*A01D 34/82* (2006.01)
*A01D 34/66* (2006.01)
*A01D 101/00* (2006.01)

(52) U.S. Cl.
CPC ......... *A01D 34/008* (2013.01); *A01D 34/006* (2013.01); *A01D 34/66* (2013.01); *A01D 34/82* (2013.01); *A01D 2101/00* (2013.01)

(58) Field of Classification Search
CPC .... A01D 34/00; A01D 34/001; A01D 34/006; A01D 34/42; A01D 34/43; A01D 34/44; A01D 34/62; A01D 34/63; A01D 34/64; A01D 34/66; A01D 34/685; A01D 34/82; A01D 2101/00; A01D 43/00–16
See application file for complete search history.

(56) References Cited

U.S. PATENT DOCUMENTS

| | | | |
|---|---|---|---|
| 4,876,845 A | 10/1989 | Sturgill | |
| 5,794,424 A | 8/1998 | Ermacora et al. | |
| 6,131,379 A * | 10/2000 | Ehn, Jr. ................. | A01D 34/43 56/15.7 |
| 7,918,305 B2 * | 4/2011 | Scherbring ............ | A01D 34/64 180/408 |
| 9,616,893 B2 * | 4/2017 | Bejcek ............ | B60W 30/18009 |
| 2011/0179759 A1 * | 7/2011 | Goman ................. | A01D 34/62 56/253 |
| 2018/0295774 A1 * | 10/2018 | Nielsen ................ | A01D 34/006 |
| 2019/0045712 A1 | 2/2019 | Georgoulias et al. | |

* cited by examiner

*Primary Examiner* — Adam J Behrens
(74) *Attorney, Agent, or Firm* — Kirton McConkie; Brian Tucker

(57) ABSTRACT

A mower can include a control system that is configured to detect when the mower is turning or will be turned and can adaptively support one or more mower decks during the turn to transfer weight from the mower decks to the mower's tires. This transfer of weight will increase the traction of the mower's tires while also minimizing the yawing force caused by the mower decks thereby preventing the mower from slipping during the turn.

20 Claims, 10 Drawing Sheets

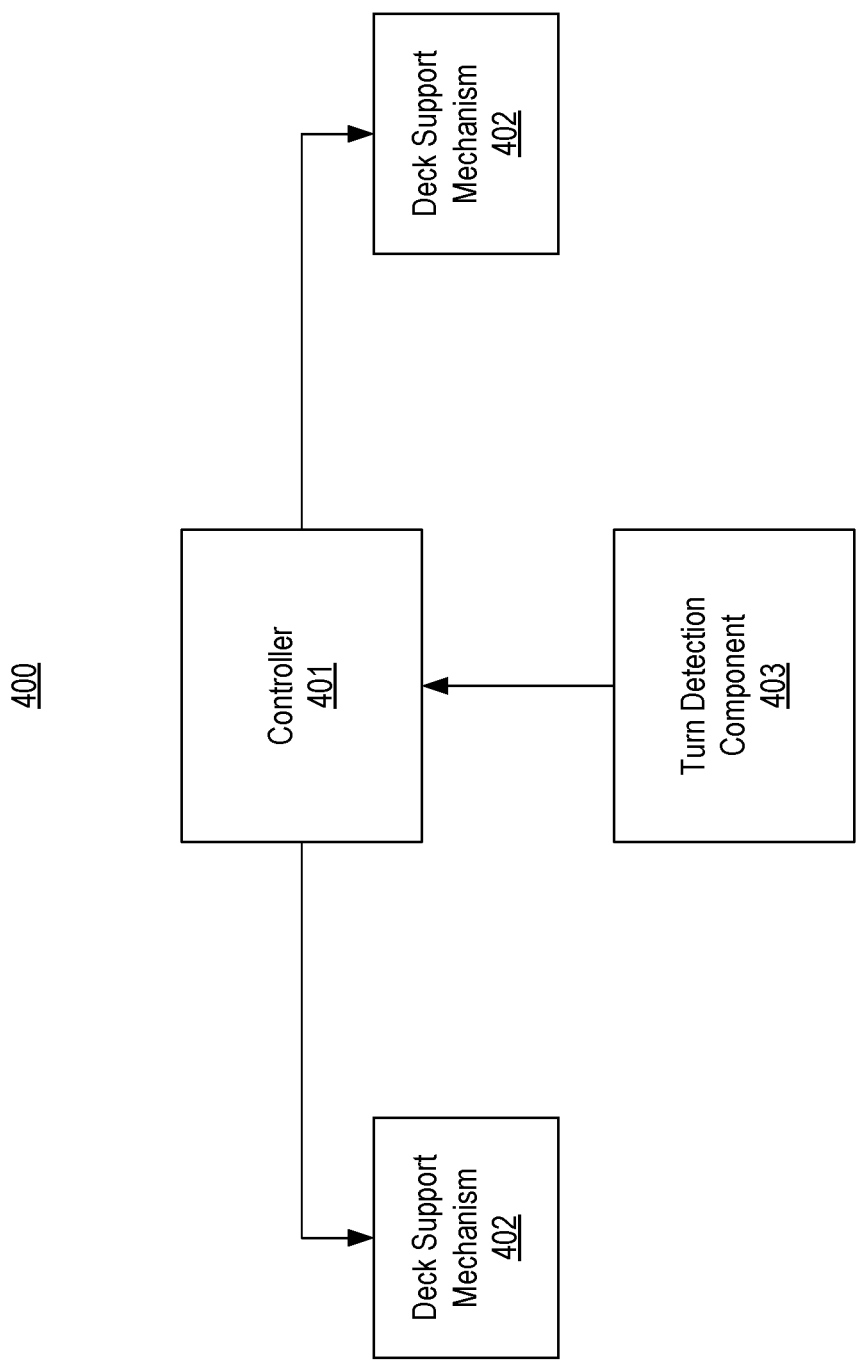

FACILITATING TURNING OF A MOWER

CROSS-REFERENCE TO RELATED APPLICATIONS

N/A

BACKGROUND

Golf courses, sod farms, and other establishments with expansive grassy areas typically employ large commercial mowers to cut grass. A typical commercial mower may include multiple "mower decks" that house the cutting blades. Unlike a common residential mower, the mower deck of commercial mowers typically houses multiple (e.g., 2-4) cutting blades. These large commercial mowers oftentimes include multiple mower decks that are arranged in a side-by-side fashion to allow the mower to cut a large width of grass with each pass.

BRIEF SUMMARY

The present invention extends to methods for facilitating turning of a mower and to mowers that are configured to perform such methods. These methods are particularly beneficial to mowers that have multiple mower decks including mower decks that extend outwardly from the main body of the mower. A mower can include a control system that is configured to detect when the mower is turning or will be turned and can dynamically lift one or more of the mower decks slightly during the turn to transfer weight from the mower decks to the mower's tires. This transfer of weight will increase the traction of the mower's tires while also minimizing the yawing force caused by the mower decks thereby preventing the mower from slipping during the turn.

In one embodiment, the present invention is implemented as a method performed by a control system of a mower that includes at least one side mower deck that is supported from a main body of the mower and that extends outwardly from a side of the main body. The control system detects that the mower is travelling in a straight direction, and in response, causes a deck support mechanism to allow the side mower deck to move with a contour of the ground over which the side mower deck is travelling. The control system then detects an occurrence of a turn of the mower. In response to detecting the occurrence of the turn, the control system causes the deck support mechanism to support a greater percentage of weight of the side mower deck to thereby shift at least a portion of the weight of the side mower deck from the side mower deck to the main body of the mower during the turn.

In another embodiment, the present invention is implemented as a mower that includes: a main body; a first side mower deck that extends outwardly from a first side of the main body; and a control system that includes a controller, a turn detection component, and a first deck support mechanism. The first deck support mechanism controls an amount of weight of the first side mower deck that is supported by the main body. The turn detection component is configured to notify the controller when the mower is or will be turning. The controller is configured to control the first deck support mechanism such that, while the mower is turning in a first direction, the controller causes the first deck support mechanism to support a greater percentage of the weight of the first side mower deck, whereas, while the mower is travelling in a straight direction, the controller causes the first deck support mechanism to support a lesser percentage of the weight of the first side mower deck such that at least a portion of the weight of the first side mower deck is shifted from the first side mower deck to the main body of the mower while the mower is turning in the first direction.

In another embodiment, the present invention is implemented as a mower that includes: a main body that includes tires for carrying the main body across the ground; a right side mower deck that extends from a right side of the main body; a left side mower deck that extends from a left side of the main body; and a control system that includes a controller, a right deck support mechanism that controls an amount of weight of the right side mower deck that is supported by the main body, and a left deck support mechanism that controls an amount of weight of the left side mower deck that is supported by the main body. The controller is configured to detect when the mower is turning. When it is detected that the mower is not turning, the controller causes the first and second deck support mechanisms to allow the first and second side mower decks respectively to move with a contour of the ground over which the first and second side mower deck are travelling. When it is detected that the mower is turning left, the controller causes the right deck support mechanism to support a greater percentage of weight of the right side mower deck. When it is detected that the mower is turning right, the controller causes the left deck support mechanism to support a greater percentage of weight of the left side mower deck.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an example of a control system that can be incorporated into a mower to facilitate turning;

DETAILED DESCRIPTION

Figure 1:
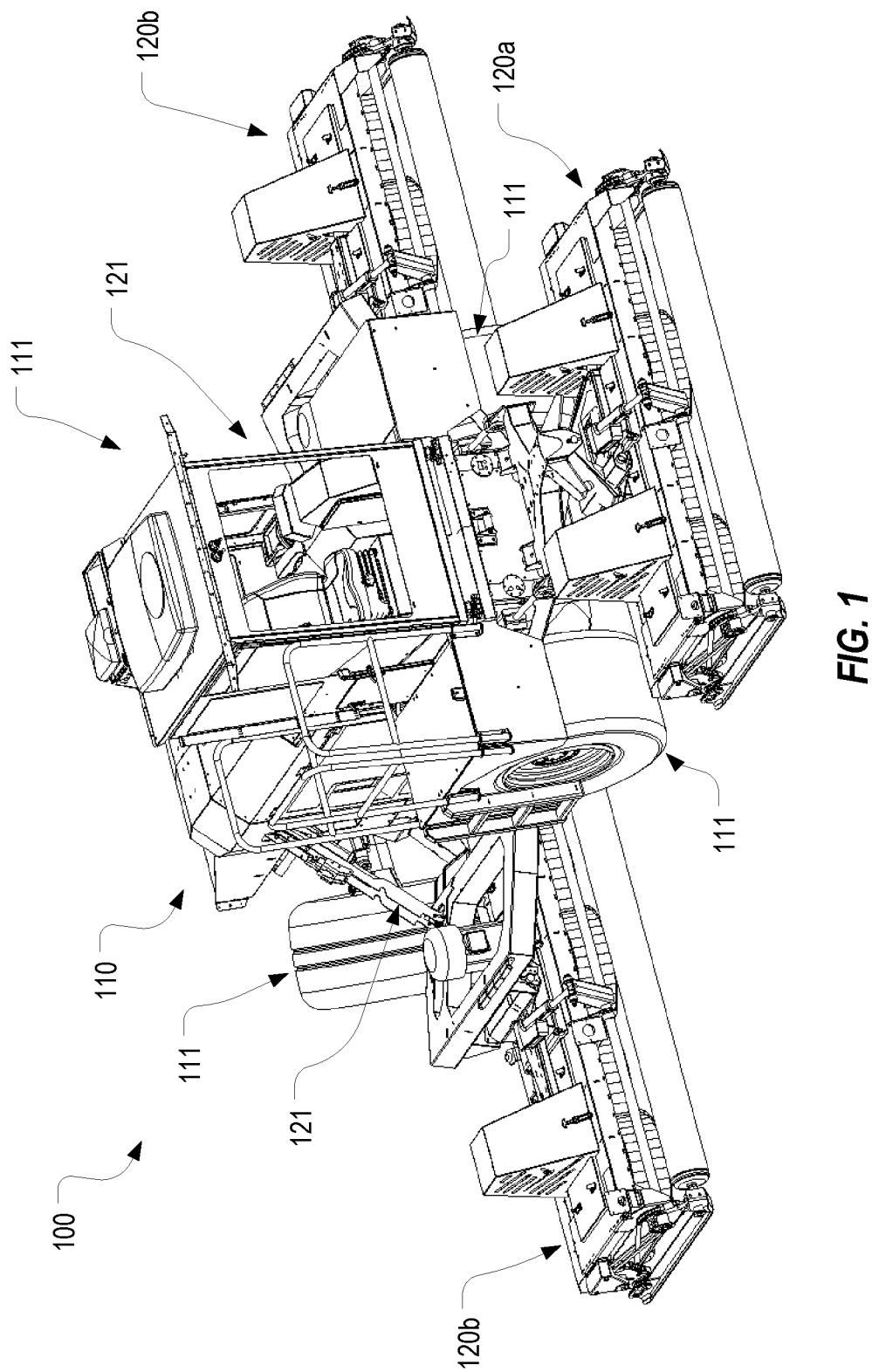
FIG. 1 illustrates an example of mower that can be configured in accordance with embodiments of the present invention.

FIG. 1 illustrates an example mower 100 that can be configured in accordance with embodiments of the present invention. Mower 100, which is in the form of a tractor, includes a main body 110 that is supported by a number of tires 111. Although mower 100 is shown as having two front and two rear tires, other tire configurations could equally be employed. Mower 100 also includes a front mower deck 120a that is supported from the front of main body 110 and side mower decks 120b that are supported from opposing sides of main body 110 (collectively referred to as mower decks 120). Although mower decks 120 could be of any reasonable size, in some embodiments, the width of mower decks 120 can be between 6 and 8 feet such that the full cutting width of mower is in excess of 20 feet.

In the depicted embodiment, side mower decks 120b are positioned between the front and rear wheels and are supported from an arm 121 which allows each side mower deck 120b to be independently pivoted towards and away from main body 110. In FIG. 1, side mower decks 120b are in a cutting position in which they extend outwardly from main 110 in a generally horizontal orientation. In some embodiments, arm 121 can be configured to retract into main body 110 to thereby lift the corresponding side mower deck 120b towards a vertical orientation. This vertical orientation can be employed during transport of mower 100 or when side mower deck 120b is not needed for cutting. In other embodiments, arm 121 could be configured to lift side mower deck 120b in a different fashion (i.e., without retracting into main body 110) or any other suitable type of mechanism can be employed to lift side mower deck 120b.

Figure 2:
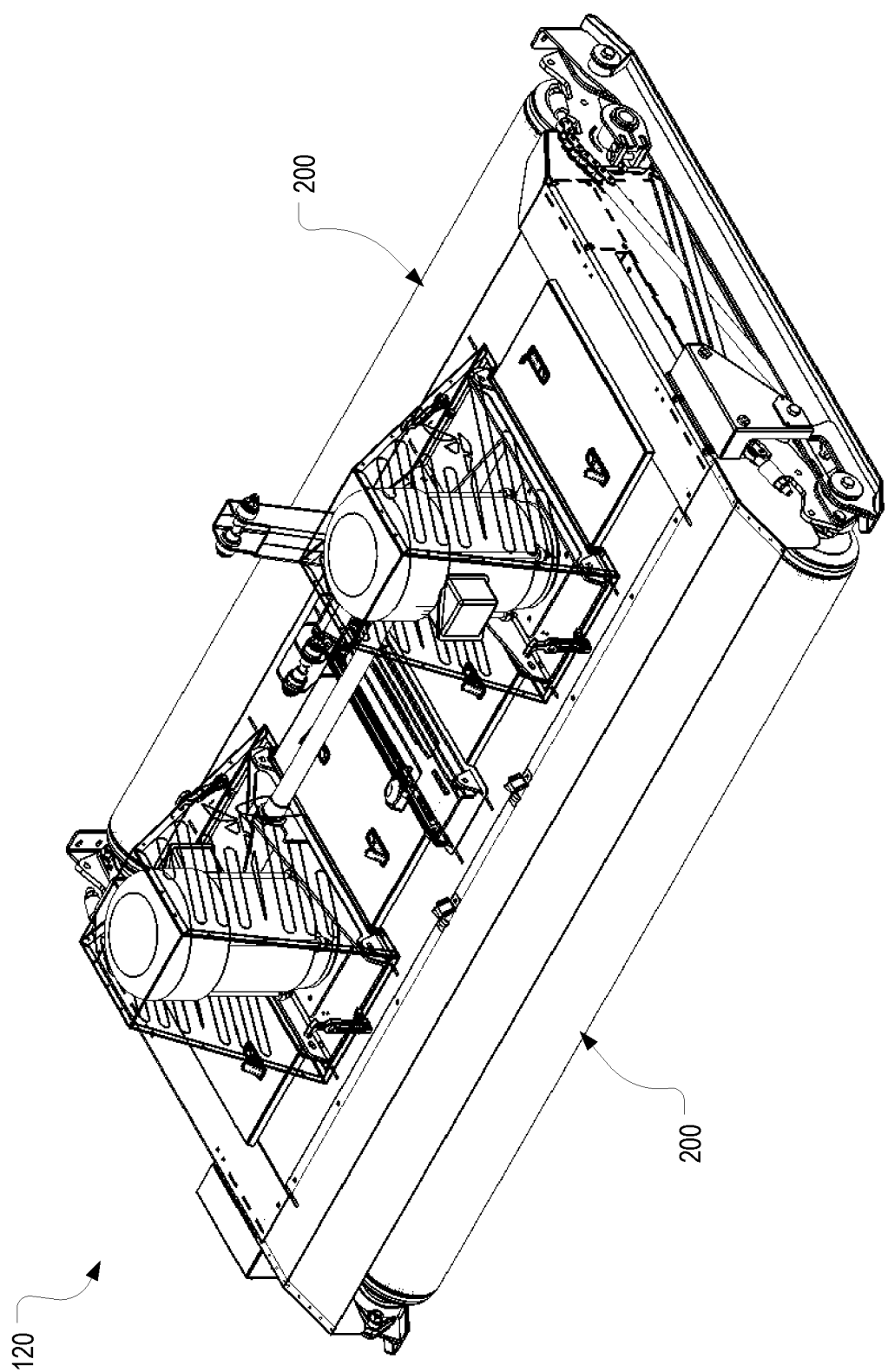
FIG. 2 illustrates a mower deck of the mower of FIG. 1.

Therefore, the exact manner in which side mower deck 120b is supported from main body 110 as well as how it is lifted from or lowered towards the ground is not essential to the present invention. Of importance is the fact that each side mower deck 120b is supported from main body 110 in a manner that allows the side mower deck to be selectively lifted. In this context, the term "arm" should be construed as any structure that supports a side mower deck 120b from main body 110 and that may allow the vertical position of side mower deck 120b relative to main body 110 to be adjusted. It is noted that arm 121 functions to control the vertical position of the entire side mower deck 120b, but does not directly control the cutting height of the side mower deck. In contrast, the cutting height of mower decks 120 can be controlled using the position of rollers 200 relative to the body of the mower decks as is shown in FIG. 2 and is described in U.S. patent application Ser. No. 15/795,065 which is incorporated herein by reference.

With reference to FIG. 2, each mower deck 120 includes front and rear rollers 200 which support the body of mower deck 120 off the ground at a desired height. In the cutting mode, arms 121 can be actuated to cause side mower decks 120b to be lowered until rollers 200 contact the ground. Accordingly, during cutting, rollers 200 will substantially support the weight of side mower decks 120b. To allow side mower decks 120b to travel with the contour of the ground, mower 100 can be configured to allow side mower decks 120b to rest directly on the ground as will be described further below.

Figure 3A:
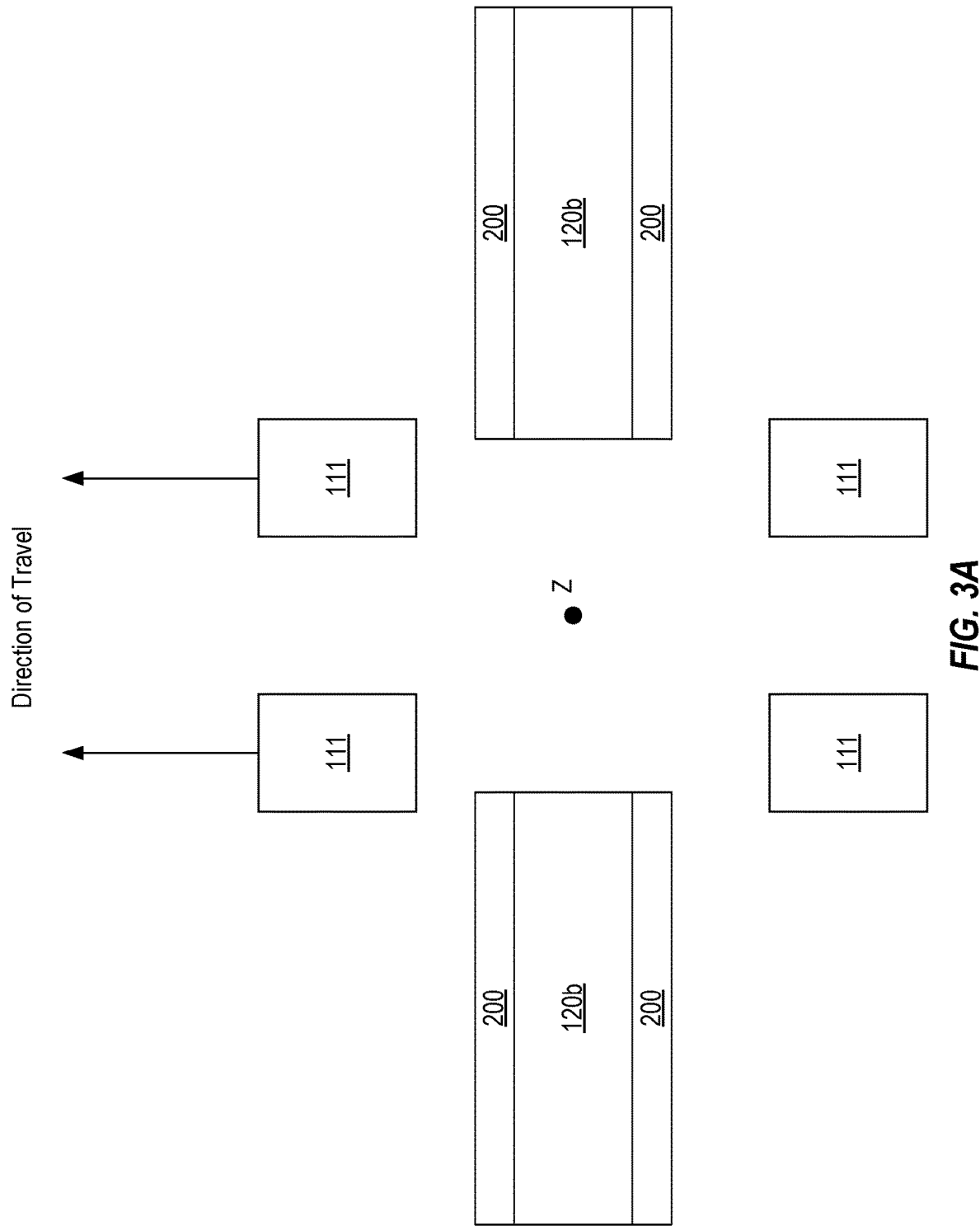
FIGS. 3A and 3B depict how the mower decks can create a yawing force when the mower turns.
Figure 3B:
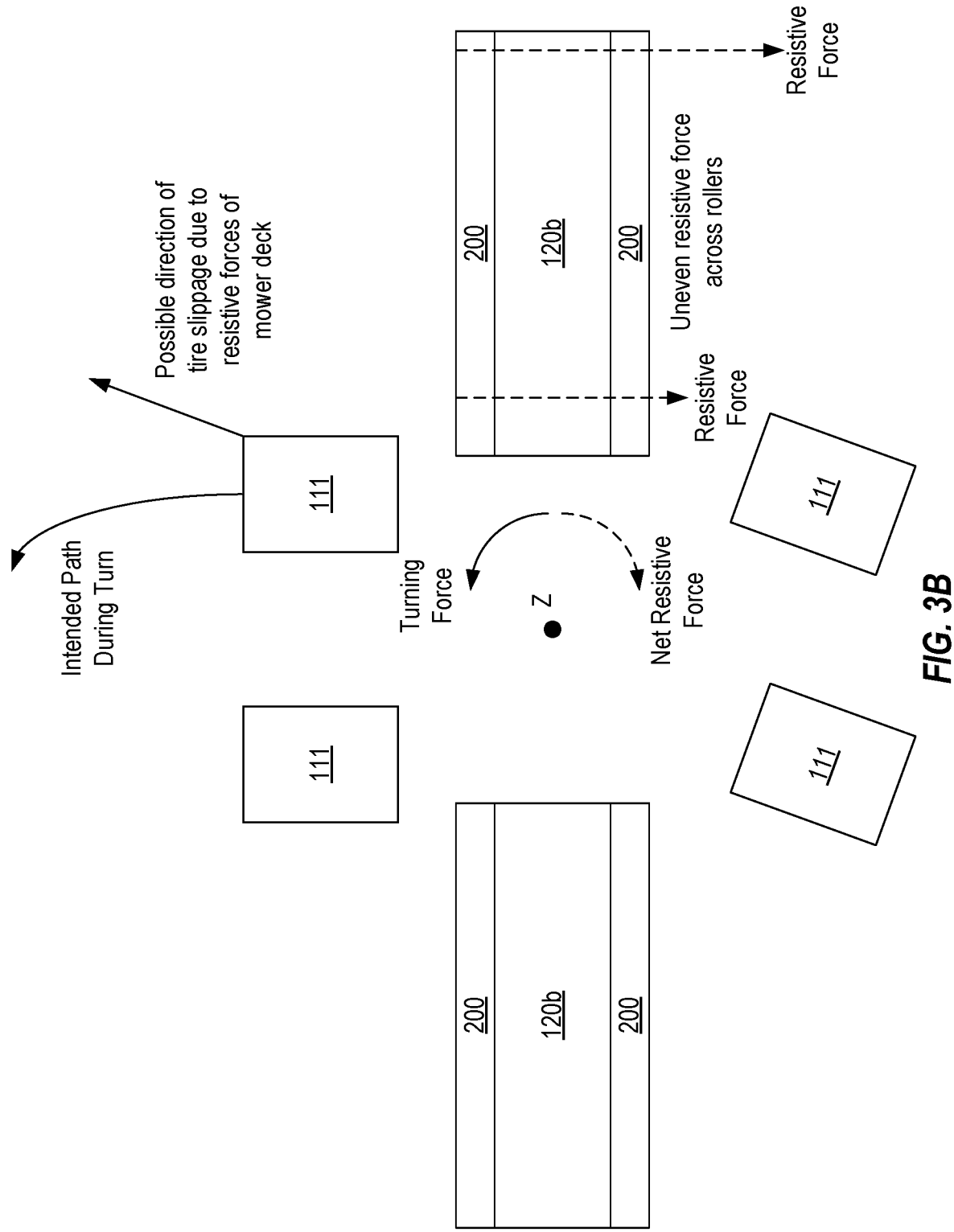

FIGS. 3A and 3B provide a block diagram of various components of mower 100 and are intended to represent a difficulty created by side mower decks 120b while mower 100 is turning. FIG. 3A depicts the orientation of tires 111 and side mower decks 120b while mower 100 is traveling in a straight direction. To simplify the figure, main body 110 and front mower deck 120a are not depicted. For purposes of illustration, it will be assumed that mower 100 includes a vertical (Z) axis located somewhere between side mower decks 120b and between the front and rear tires although the precise location of the Z axis is not essential to the invention.

As indicated above, while cutting, side mower decks 120b can be allowed to rest directly on the ground. For example, arm 121 can be lowered to allow the full weight of side mower deck 120b to be supported by rollers 200 as opposed to being supported by arm 121. Therefore, as mower 100 travels, the weight of main body 110 will be supported by tires 111 while the weight of each side mower deck 120b will be at least substantially supported by the corresponding pair of rollers 200. By employing rollers 200, and by allowing side mower deck 120b to rest on the ground, side mower deck 120b will adapt to the contour of the ground and minimize the occurrence of scalping (e.g., by spanning dips or bumps in the ground).

As mower 100 travels in a straight direction, rollers 200 will roll across the ground and experience substantially equal resistance across their width. In other words, as the engine of mower 100 propels main body 110 forward, each of side mower decks 120b will also be propelled forward, and any rearward resistive force caused by one side mower deck 120b would be offset by the other side mower deck 120b such that a yawing force would not exist around the Z axis.

In contrast, as mower 100 turns, an imbalance in resistive force will be created. FIG. 3B is intended to represent this scenario. As shown in FIG. 3B, rear tires 111 have been rotated in an attempt to cause mower 100 to make a left turn. As main body 110 turns leftward along an arc, side mower decks 120b will likewise travel along a corresponding arc. However, because side mower decks 120b extend outwardly a substantial distance from main body 110, and because of the substantial width of rollers 200, it is believed that an uneven resistive force will exist across rollers 200. For example, as shown in FIG. 3B, the resistive force at the outside of right-side mower deck 120b will be greater than the resistive force at the inside of right-side mower deck 120b. It is believed that this uneven force across roller 200 is due to the fact that roller 200 is a continuous cylinder and the outer end of the cylinder must travel a greater distance than the inner end of the cylinder during the turn. Therefore, the outer end of roller 200 will be dragged (as opposed to rolled) to keep up with the inner end. Depending on the degree of the turn, the inner end may also be dragged as main body 110 turns.

In short, for the side mower deck 120b on the outside of the turn, because the rotation of the outer end of roller 200 is tied to the rotation of the inner end of roller 200, but the arc length travelled by the outer end of roller 200 is greater than the arc length travelled by the inner end of roller 200 during a turn, roller 200 will be forced to slide along the ground. Although a similar phenomenon may occur on the inside mower deck 120b, the impact is believed to be negligible relative to the impact caused by the outside mower deck 120b, and in any case, would add to the overall resistive force.

As a result, and as represented in FIG. 3B, a net resistive force (or a yawing force) will exist about the Z axis in a direction that is opposite that of the turn. For example, tires 111 will cause main body 110 to turn in a counterclockwise direction relative to the Z axis while the net resistive force caused by the right-side mower deck 120b will be in a clockwise direction. If this net resistive force exceeds a threshold, it may cause tires 111 to slip. In other words, if the frictional force between tires 111 and the ground is not sufficient, the yawing force may cause mower 100 to slide forward in general alignment with the direction of rear tires 111. Even if mower 100 does not slide during the turn, the yawing force may cause mower 100 to consume more power during the turn and otherwise make turning more difficult.

To address the yawing force created by side mower decks 120b during a turn, mower 100 can be configured with a control system 400 as shown in FIG. 4. Control system 400 can include a controller 401, a deck supporting mechanism 402 for each of side mower decks 120b, and a turn detection component 403. Controller 401 can be any type of circuitry that is capable of receiving input from turn detection component 403 and of providing control signals to deck support mechanism 402 based on such input. For example, controller 401 could be a processor, a microcontroller, an FPGA, an ASIC, a PLC, etc.

Deck support mechanism 402 can represent any components that can be configured to selectively support side mower deck 120b. For example, deck support mechanism 402 could represent a hydraulic or pneumatic valve that drives a piston to which arm 121 is coupled, an electric actuator that is coupled to arm 121, a mechanical actuator, etc.

Turn detection component 403 can represent a number of different types of components that can detect, identify, or report that mower 100 is turning or should turn. For example, turn detection component 403 could represent one or more sensors on mower 100 that can detect when mower 100 has commenced turning, including the direction of the turn. Such sensors could be positioned anywhere on mower 100 and configured to detect the physical forces of the turn (e.g., one or more accelerometers), incorporated into the steering system (e.g., to detect when an operator has turned the steering wheel), incorporated into side mower decks 120b (e.g., to measure resistive forces and/or detect sliding of rollers 200), incorporated into arm 121 or deck support mechanism 402 (e.g., to detect variations in the load caused by side mower deck 120b that exist during a turn), etc. Alternatively or additionally, turn detection component 403 could be a computing device that controls the travel of mower 100 in accordance with a defined path (e.g., when mower 100 is self-driving). In such cases, turn detection component 403 can identify when mower 100 should be turned based on the defined path and can notify controller 401 accordingly. In some cases, turn detection component 403 could be in the form of a manual switch or other user input element that an operator can select to report when mower 100 is turning or will be turned. For example, a user interface element of a control display could be selectable at the beginning of a turn and again at the end of the turn.

Regardless of how turn detection component 403 is configured, it can provide some type of input to controller 401 to identify when a turn is being performed. For example, turn detection component 403 can raise a signal whenever it detects or determines that a turn is or will be performed. Controller 401 can treat the presence of this signal as an indication that mower 100 is turning. Alternatively, turn detection component 403 may use different signals to indicate the start and end of a turn. In some cases, turn detection component 403 can also identify the direction of the turn to controller 401. Of course, more complex communication schemes could be employed between turn detection component 403 and controller 401 including the use of communication packets to convey the occurrence and possibly details of a turn.

In any case, controller 401 can be configured to respond to signals from turn detection component 403 by controlling one or both of deck support mechanisms 402. This controlling can include actuating deck support mechanism 402 to cause the corresponding side mower deck 120b to be supported during the turn (as opposed to floating). For example, deck support mechanism 402 could be actuated to cause arm 121 to substantially support the weight of side mower deck 120b (or increase the amount of weight that arm 121 supports) thereby shifting the mower deck's weight from rollers 200 to tires 111. This adaptive supporting of the weight of side mower deck 120b could entail lifting side mower deck 120b relative to main body 110 during a turn or supporting a greater percentage of the weight of side mower deck 120b without lifting side mower deck 120b during a turn.

More specifically, when controller 401 determines that mower 100 is not turning, it can control deck support mechanism 402 such that it allows the vertical position of side mower deck 120b relative to main body 110 to vary with the contour of the ground. In this case, rollers 200 will support substantially all the weight of side mower deck 120b. In contrast, when controller 401 determines that mower 100 is turning, it can control deck support mechanism 402 such that rollers 200 support a reduced amount of the weight of side mower deck 120b. Rollers 200 will preferably still support some of the weight of mower deck 120b (because rollers 200 should remain on the ground so that the cutting height of the mower deck is maintained during the turn), but a substantial amount of the weight will be transferred to tires 111 via arm 121 and main body 110. For example, deck support mechanism 402 can be actuated in a manner that prevents side mower deck 120b from falling below a particular vertical position relative to main body 110 while still being able to float with the contour of the ground.

By shifting the weight of side mower deck 120b from rollers 200 to tires 111 during a turn, the yawing force created by rollers 200 will be reduced while the traction of tires 111 will be increased. This in turn will reduce the possibility of mower 100 slipping during the turn and make turning more efficient and easy.

As mentioned above, controller 401 could be configured to cause both deck support mechanisms 402 to support their respective side mower decks 120b during a turn. However, in some embodiments, controller 401 could be configured to cause only the deck support mechanism 402 on the outside of the turn to support its corresponding side mower deck 120b. For example, in scenarios where the signal or other communication provided by turn detection component 403 identifies the direction of the turn, controller 401 could use this identification of the direction to output a control signal only to the deck support mechanism 402 on the outside of the turn (e.g., if controller 401 determines that mower 100 is turning left, it can control the deck support mechanism 402 on the right side of mower 100). By only controlling the deck support mechanism 402 on the outside of the turn, greater efficiency can be achieved.

Figure 4A:
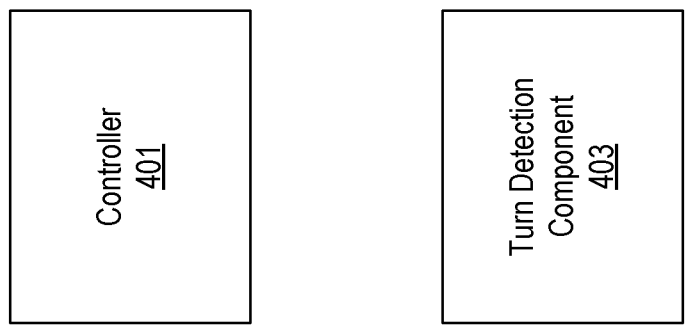
FIGS. 4A-4C illustrate an example of how a control system can be employed to lift and support a mower deck during a turn.
Figure 4A:
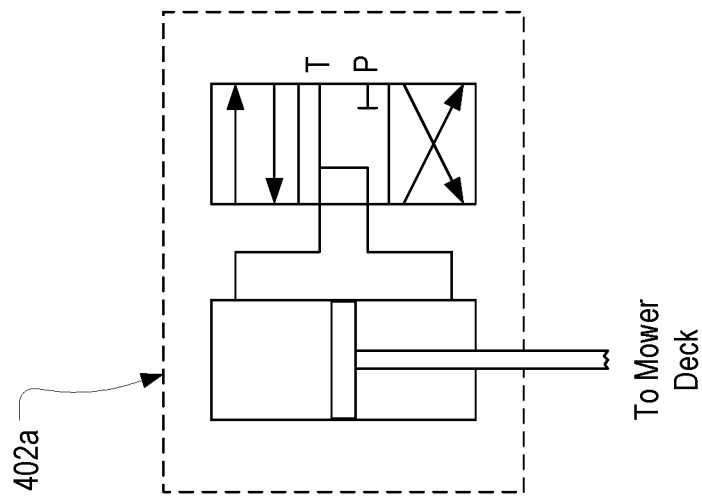
Figure 4B:
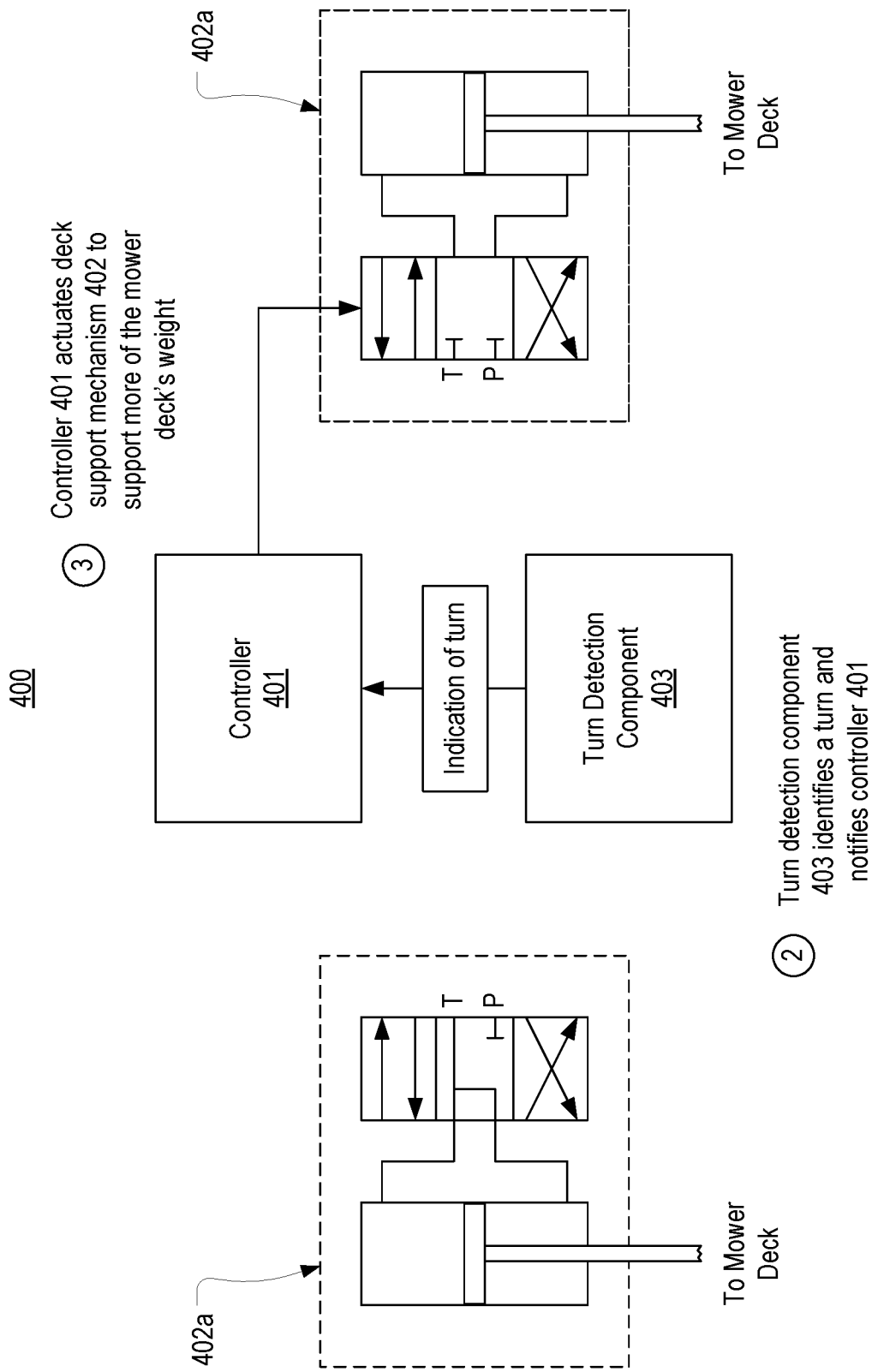
Figure 4C:
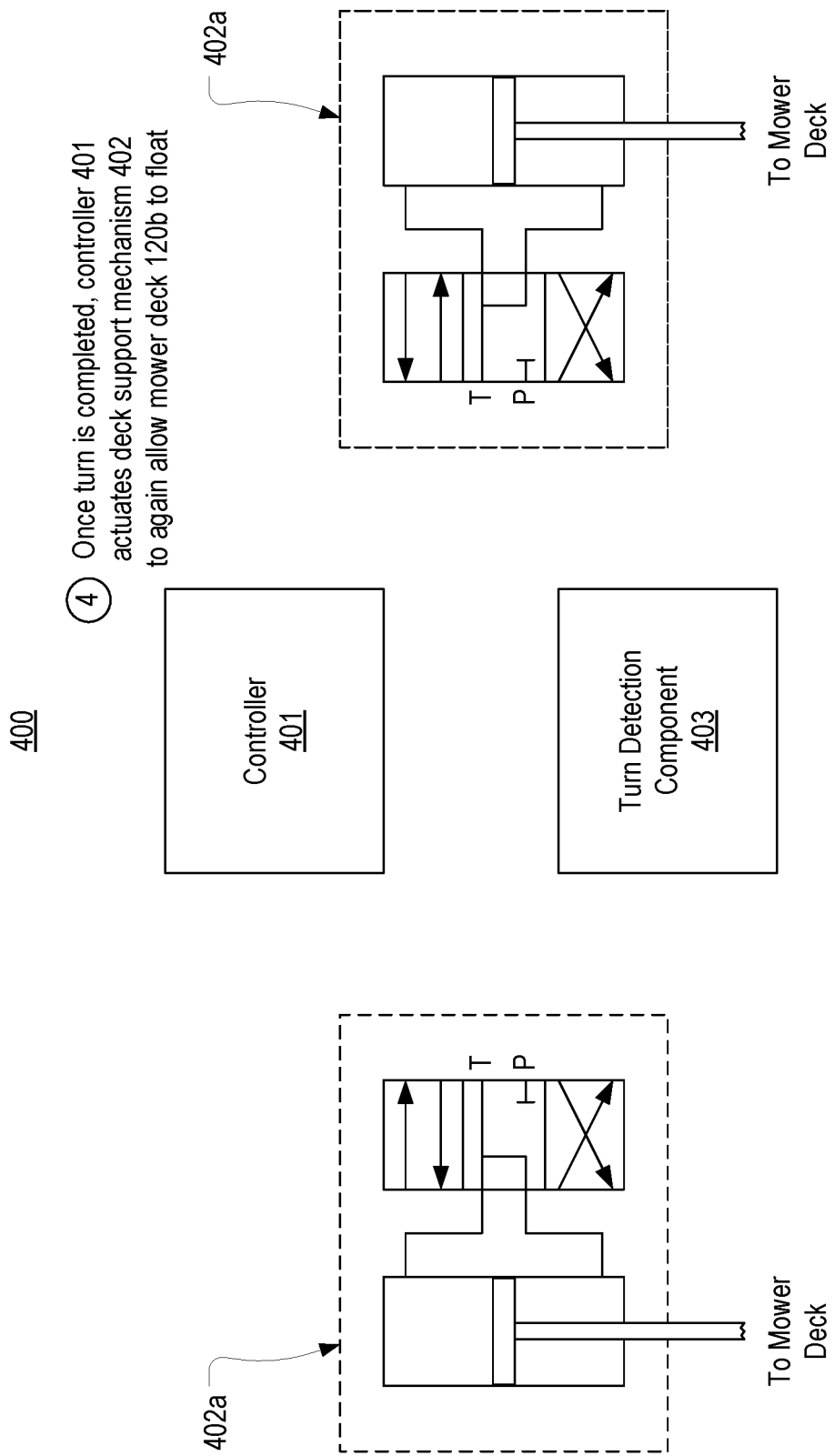

FIGS. 4A-4C provide an example of how control system 400 could be implemented using hydraulic components. As shown, deck support mechanism 402 has been replaced with hydraulic deck support mechanism 402a which comprises a hydraulic value and a hydraulic cylinder whose piston rod can be coupled to arm 121. As mentioned above, deck support mechanism 402 could equally be implemented with electrical, mechanical, pneumatic, and/or any other suitable components.

In this example, it is assumed that turn detection component 403 only provides a signal during a turn, and therefore an absence of a signal represents that mower 100 is travelling straight. Accordingly, in step 1, controller 401 determines that mower 100 is travelling straight and causes the hydraulic values to remain in a floating position. In this floating position, both ports of the cylinder can be connected to the tank such that the piston is allowed to freely move within the cylinder. As such, side mower deck 120b will be allowed to move vertically with the contour of the ground independently of the relative position of main body 110.

Turning to FIG. 4B, it is assumed in step 2 that turn detection component 403 identifies a turn and notifies controller 401 accordingly. As mentioned above, turn detection component 403 can identify a turn in a number ways including by sensing that mower is turning, by determining that a self-driven mower has reached a turn in a defined path, etc. As also mentioned above, turn detection component 403 can notify controller 401 in any suitable way including by raising a particular signal or signals, by sending a communication packet, etc. In this example, it will be assumed that turn detection component 403 notifies controller 401 of the occurrence of the turn as well as the direction of the turn which in this case is left.

In step 3, and in response to the indication from turn detection component 403, controller 401 can control the hydraulic valve of the deck support mechanism 402a corresponding to the side mower deck 120b on the right side of mower 100 to retain the piston at or above a particular position. As mentioned above, this position can be a position that causes rollers 200 to remain on the ground but that also shifts at least some of the weight of side mower deck 120b from rollers 200 to tires 111. Preferably, the piston will be allowed to float above this position so that side mower deck 120b will still be able to float with the contour of the ground.

As mentioned above, in some embodiments, turn detection component 403 could be in the form of a sensor that monitors the load caused by side mower deck 120b. For example, a pressure sensor could be incorporated into the hydraulic system to monitor the pressure of the hydraulic fluid. In such cases, controller 401 could actuate the hydraulic valve of deck support mechanism 402a to maintain a constant pressure during a turn. A similar technique could be employed using a load sensor that is incorporated into arm 121 or another component to sense variations in the load caused by side mower deck 120b during a turn. In short, any technique for detecting the occurrence of a turn and for shifting weight from side mower deck 120b to tires 111 during the turn can be employed.

Finally, in step 4 as shown in FIG. 4C, once controller 401 has detected that mower 100 is no longer turning (e.g., because turn detection component 403 is no longer raising the signal, has sent a communication packet, or has otherwise communicated the end of the turn), it can control the valve of deck support mechanism 402a to return it to the floating position.

In summary, control system 400 can cause a greater amount of the weight of the side mower deck 120b on the outside of the turn, or possibly of both side mower decks 120b, to be supported from main body 110 during the turn than when mower 100 is not turning. This shifting of the weight from rollers 200 during the turn will minimize the yawing force that rollers 200 will create during the turn and may also provide greater traction to tires 111. As a result, mower 100 will be less likely to slide during a turn and may also perform turns with greater efficiency.

Although mower 100 is described as having a side mower deck 120b on each side, it is also possible that mower 100 may include a side mower deck 120b only on one side of the mower or multiple side mower decks 120b on the same side of the mower. Regardless of the number of side mower decks 120b a mower may have, the techniques described above can be employed to selectively support any of the side mower decks during a turn.

Figure 5:
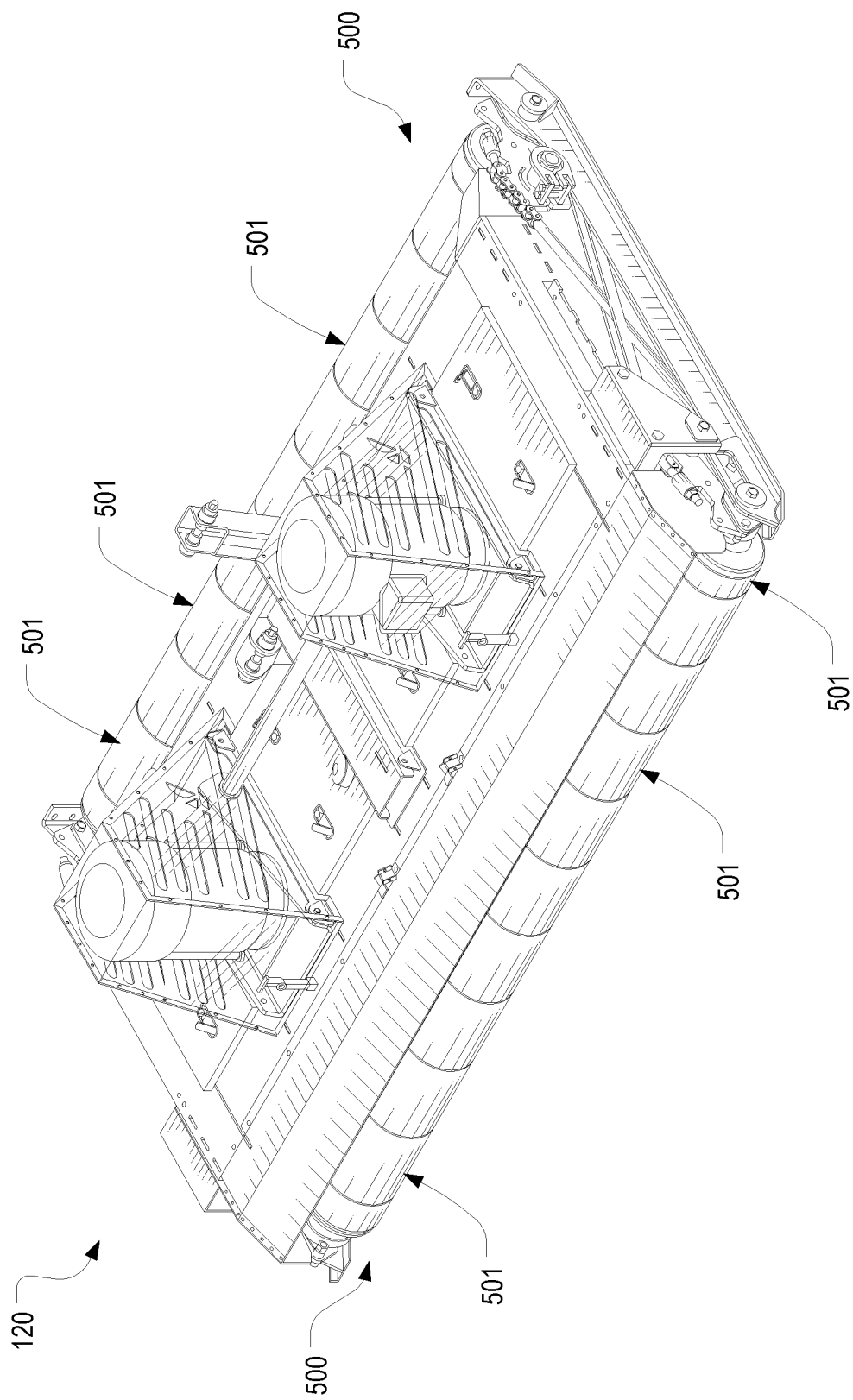
FIG. 5 illustrates an embodiment of a mower deck that includes segmented rollers.
Figure 5A:
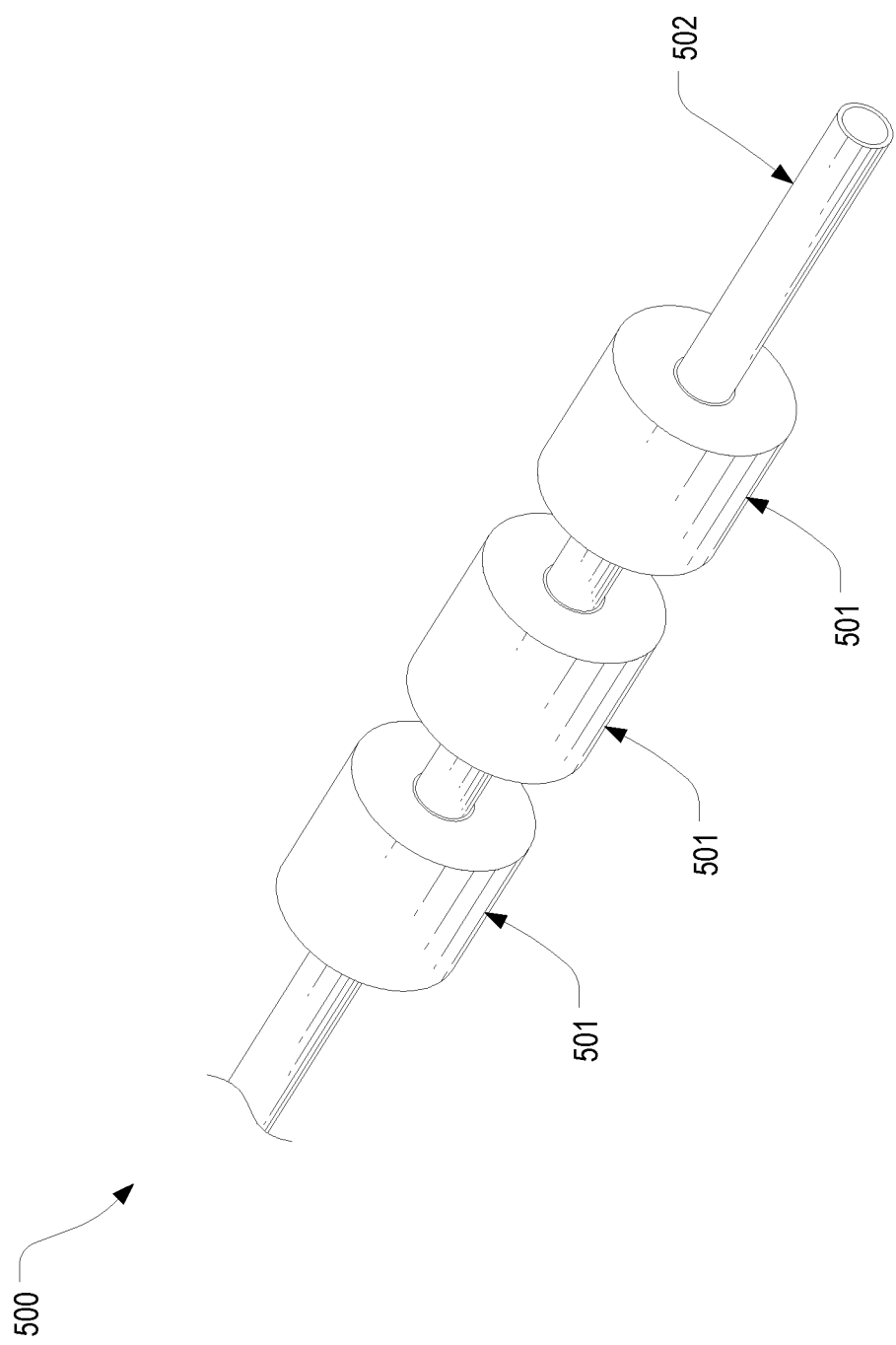
FIG. 5A illustrates a partial exploded view of a segmented roller.

FIG. 5 illustrates an embodiment of mower deck 120 which includes segmented rollers 500 while FIG. 5A illustrates a partial exploded view of a segmented roller 500. In contrast to rollers 200 which consist of a single cylinder, segmented rollers 500 consist of multiple roller segments 501 that are positioned along and rotate around a shaft 502 that extends between the opposing sides of mower deck 120. Each of roller segments 501 can be configured to independently rotate around shaft 502. In this way, roller segments 501 on the outside of a turn can rotate more than roller segments 501 on the inside of the turn to account for the greater distance that the outer end of segmented roller 500 must travel during a turn. As a result, any yawing force that may develop during a turn may be minimized. A mower deck 120 with segmented rollers 500 could be used in conjunction with or independent of the weight shifting techniques described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, performed by a control system of a mower that includes a controller, a turn detection component and at least one side mower deck that is supported from a main body of the mower and that extends outwardly from a side of the main body, the method comprising:
    detecting, by the controller, that the mower is travelling in a straight direction, and in response, causing a deck support mechanism to allow the side mower deck to move with a contour of a ground surface over which the side mower deck is travelling;
    detecting, by the controller and based on at least one signal or communication from the turn detection component, an occurrence of a turn of the mower; and
    in response to detecting the occurrence of the turn, causing, by the controller, the deck support mechanism to support a greater percentage of weight of the side mower deck to thereby shift at least a portion of the weight of the side mower deck from the side mower deck to the main body of the mower during the turn.

2. The method of claim 1, wherein the turn detection component is one of integrated into or communicatively coupled to the controller.

3. The method of claim 1, wherein the turn detection component generates the at least one signal or communication based on one of:
    sensing that the mower is turning;
    determining that a path that the mower is following includes a turn; or
    sensing variations in a load caused by the side mower deck.

4. The method of claim 1, wherein the at least one signal or communication identifies a direction of the turn.

5. The method of claim 1, wherein the side mower deck is a first side mower deck that extends from the side of the main body that is on an outside of the turn, the mower further including a second side mower deck that extends from an opposite side of the main body.

6. The method of claim 5, further comprising:
in response to detecting the occurrence of the turn, causing a second deck support mechanism to support a greater percentage of weight of the second side mower deck to thereby shift at least a portion of the weight of the second side mower deck from the second side mower deck to the main body of the mower.

7. The method of claim 1, wherein causing the deck support mechanism to support a greater percentage of weight of the side mower deck comprises causing the deck support mechanism to maintain the side mower deck at or above a particular vertical position relative to the main body of the mower.

8. The method of claim 1, wherein causing the deck support mechanism to support a greater percentage of weight of the side mower deck comprises causing the deck support mechanism to lift the side mower deck to a fixed vertical position relative to the main body of the mower.

9. The method of claim 1, further comprising:
determining that the occurrence of the turn has completed, and in response, causing the deck support mechanism to cease supporting the greater percentage of weight of the side mower deck.

10. The method of claim 1, wherein the deck support mechanism comprises a hydraulic valve, and wherein causing the deck support mechanism to allow the side mower deck to move with the contour of the ground surface comprises setting the hydraulic valve to a float position.

11. The method of claim 10, wherein causing the deck support mechanism to support the greater percentage of weight of the side mower deck comprises actuating the hydraulic valve.

12. A mower comprising:
a main body;
a first side mower deck that extends outwardly from a first side of the main body; and
a control system that includes a controller, a turn detection component, and a first deck support mechanism, the first deck support mechanism controlling an amount of weight of the first side mower deck that is supported by the main body;
wherein the turn detection component is configured to notify the controller when the mower is or will be turning, and the controller is configured to control the first deck support mechanism including:
while the mower is travelling in a straight direction, the controller causes the first deck support mechanism to support a lesser percentage of the weight of the first side mower deck, whereas while the mower is turning in a first direction, the controller causes the first deck support mechanism to support a greater percentage of the weight of the first side mower deck such that, in conjunction with the mower transitioning from travelling in the straight direction to turning in the first direction, the controller causes at least a portion of the weight of the first side mower deck to be shifted from the first side mower deck to the main body of the mower.

13. The mower of claim 12, further comprising:
a second side mower deck that extends outwardly from a second side of the main body opposite the first side;
wherein the control system further includes a second deck support mechanism, the second deck support mechanism controlling an amount of weight of the second side mower deck that is supported by the main body;
wherein the controller is configured to control the second deck support mechanism including:
while the mower is travelling in the straight direction, the controller causes the second deck support mechanism to support a lesser percentage of the weight of the second side mower deck, whereas while the mower is turning in a second direction, the controller causes the second deck support mechanism to support a greater percentage of the weight of the second side mower deck such that, in conjunction with the mower transitioning from travelling in the straight direction to turning in the second direction, the controller causes at least a portion of the weight of the second side mower deck to be shifted from the second side mower deck to the main body of the mower.

14. The mower of claim 13, wherein, when the mower is turning in the first direction, the first side mower deck travels along an outside of the turn, whereas when the mower is turning in the second direction, the second side mower deck travels along an outside of the turn.

15. The mower of claim 13, wherein the controller is configured to control the first and second deck support mechanisms such that, while the mower is turning in either the first or the second direction, the controller causes the first and second deck support mechanisms to support the greater percentage of the weight of the first and second side mower decks respectively.

16. The mower of claim 12, wherein the first side mower deck is coupled to the first deck support mechanism via an arm.

17. The mower of claim 16, wherein the first deck support mechanism is housed within the main body such that the arm extends from the first side mower deck and into the main body.

18. A mower comprising:
a main body that includes tires for carrying the main body across a ground surface;
a right side mower deck that extends from a right side of the main body;
a left side mower deck that extends from a left side of the main body; and
a control system that includes a controller, a right deck support mechanism that controls an amount of weight of the right side mower deck that is supported by the main body, and a left deck support mechanism that controls an amount of weight of the left side mower deck that is supported by the main body;
wherein the controller is configured to detect when the mower is turning and:
when it is detected that the mower is not turning, the controller causes the first and second deck support mechanisms to allow the first and second side mower decks respectively to move with a contour of the ground surface over which the first and second side mower deck are travelling;
when it is detected that the mower is turning left, the controller causes the right deck support mechanism to support a greater percentage of weight of the right side mower deck; and
when it is detected that the mower is turning right, the controller causes the left deck support mechanism to support a greater percentage of weight of the left side mower deck.

19. The mower of claim 18, wherein:
when it is detected that the mower is turning left, the controller causes the left deck support mechanism to allow the left side mower deck to move with the contour of the ground surface; and when it is detected that the mower is turning right, the controller causes the right deck support mechanism to allow the right side mower deck to move with the contour of the ground surface.

20. The mower of claim 18, wherein:

when it is detected that the mower is turning left, the controller causes the left deck support mechanism to support a greater percentage of weight of the left side mower deck; and when it is detected that the mower is turning right, the controller causes the right deck support mechanism to support a greater percentage of weight of the right side mower deck.

\* \* \* \* \*